United States Patent [19]

Oldham et al.

[11] Patent Number: 5,025,150
[45] Date of Patent: Jun. 18, 1991

[54] SITE SURVEY METHOD AND APPARATUS

[75] Inventors: James G. Oldham, Albuquerque, N. Mex.; Charles R. Spencer, Boise, Id.; Carl L. Begley; H. Robert Meyer, both of Albuquerque, N. Mex.

[73] Assignees: MK-Ferguson Company, Cleveland, Ohio; Chem-Nuclear Systems Inc., Columbia, S.C.

[21] Appl. No.: 257,732

[22] Filed: Oct. 14, 1988

[51] Int. Cl.$^5$ ............................................. G01V 5/00
[52] U.S. Cl. .................................... 250/253; 250/255; 250/491.1; 73/66.5; 73/31.05
[58] Field of Search .......... 250/253, 255, 301, 491.1; 324/326; 73/23, 40, 40.5 R, 40.7

[56] References Cited

U.S. PATENT DOCUMENTS

| | | | |
|---|---|---|---|
| 2,395,322 | 2/1946 | Evans | 97/47 |
| 2,557,158 | 6/1951 | Teichmann | 250/83.6 |
| 2,562,914 | 8/1951 | Herzog | 250/83.6 |
| 2,800,847 | 7/1957 | Bennett | 97/46.39 |
| 3,008,046 | 11/1961 | Carpenter | 250/71.5 |
| 3,124,684 | 3/1964 | Eberline | 250/71.5 |
| 3,341,706 | 12/1967 | Swift et al. | 250/83.3 |
| 3,354,310 | 11/1967 | Swift | 250/83.3 |
| 3,433,310 | 3/1969 | Harper | 172/471 |
| 3,444,721 | 5/1969 | Hearn et al. | 73/23 |
| 3,715,758 | 2/1973 | Sender | 343/112 R |
| 3,825,751 | 7/1974 | Johnson, Jr. et al. | 250/253 |
| 3,918,056 | 11/1975 | Merrick | 343/6.5 LC |
| 3,938,146 | 2/1976 | Dano | 343/6.5 LC |
| 4,056,969 | 11/1977 | Barringer | 250/255 |
| 4,232,317 | 11/1980 | Freeny, Jr. | 343/112 R |
| 4,248,310 | 2/1981 | McWilliams | 172/661 |
| 4,317,033 | 2/1982 | Panenka et al. | 250/253 |
| 4,421,981 | 12/1983 | Hough | 250/253 |
| 4,581,531 | 4/1986 | Dion | 250/253 |

OTHER PUBLICATIONS

"Use of a Commercial Ranging System in Field Surveys of Radioactively Contaminated Sites", by G. M. Worth et al., *IEEE Nuclear Science Symposium,* 1984.

"Mobile Surface Contamination Monitor for Large Area Radiological Surveillance," W. E. Clem, Rockwell Hanford Operations, Richland, Wash. 99352, *Proceedings, Waste Management,* '86, University of Arizona, Tucson.

"Field Instruments Developed for Radiation Measurements on the UMTRA Project", by H. R. Meyer et al., *Proceedings, Waste Management* 1987, University of Arizona, Tucson, Mar. 1987.

*Primary Examiner*—Carolyn E. Fields
*Assistant Examiner*—David P. Porta
*Attorney, Agent, or Firm*—Deborah A. Peacock; Robert W. Weig

[57] ABSTRACT

The disclosure of the invention is directed to a site survey ground vehicle based apparatus and method for automatically detecting source materials, such as radioactivity, marking the location of the source materials, such as with paint, and mapping the location of the source materials on a site. The apparatus of the invention is also useful for collecting and analyzing samples. The apparatus includes a ground vehicle, detectors mounted at the front of the ground vehicle, and individual detector supports which follow somewhat irregular terrain to allow consistent and accurate detection, and autolocation equipment.

53 Claims, 14 Drawing Sheets

KEY: ( x = <15cm & <=6.5pCi/g, ▫ >15cm & <=16.5pCi/g)
θ = ABOVE LIMITS

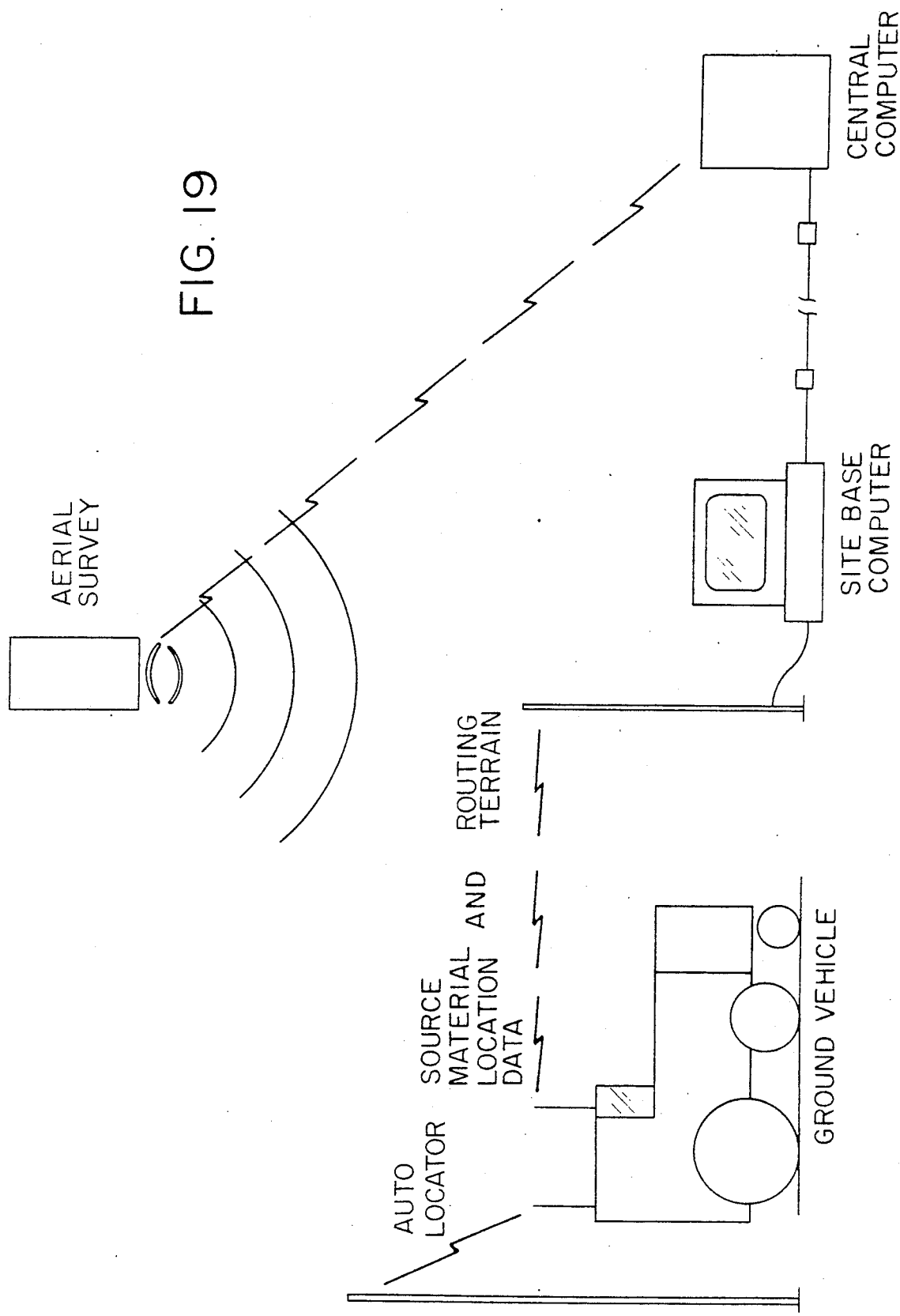

SITE SURVEY METHOD AND APPARATUS

FIELD OF THE INVENTION

This invention was made with government support under contract No. DE-AC04-83AL18796 awarded by the U.S. Department of Energy and Contract ID Code No. 34-0217470. Title and rights in and to this invention have been waived by the Department of Energy to MK-Ferguson Company, subject to a confirmatory license.

The invention relates to site surveying equipment and more particularly to an apparatus and method for moving in a predetermined manner over a site which can have a somewhat irregular terrain, and for marking, mapping, and displaying radioactive or other source material areas on the site.

BACKGROUND OF THE INVENTION

There is an ever increasing need to identify and map the locations of source materials, such as radiation emitting areas, mineral or oil deposits, hazardous or toxic wastes, or the like, on various sites. It is often important to quantitatively and/or qualitatively identify the source materials. Because most sites are not flat, it has not been possible, heretofore, to satisfactorily traverse the sites in a planned scanning or other mapping series of traverses in order to sufficiently mark and map the source material or radiation emitting areas on the site.

Aerial survey, sometimes used for identifying source materials, is disclosed in U.S. Pat. No. 3,825,751, entitled Method and Apparatus for Aerial Radioactivity Surveying for Surface Mineral Deposits Which Compensates for the Radioactive Decay Products in the Atmosphere of the Earth, to Johnson, et al; U.S. Pat. No. 2,557,158, entitled Radioactive Exploration, to Teichmann; U.S. Pat. No. 4,421,981, entitled Method and Apparatus for Conducting Remote Surveys of the Earth's Crust, to Hough; and U.S. Pat. No. 4,581,531, entitled Method for Identifying Hydrothermal Alteration Areas of the Earth, to Dion. However, to obtain more accurate surveys than provided by these devices, the detectors must be fairly close to the ground.

To locate, mark, quantify, and map radiologically active areas, some of which are not very radioactive or "hot," one must use detectors positioned a few inches above the ground. Because of the irregularities in most terrain, it has been nearly impossible to traverse terrain in an accurate scanning movement by vehicle. Many sites are several square miles in size and to survey them on foot is an expensive and time consuming task. Moreover, survey by foot is difficult because personnel find it difficult to follow a predetermined traversing pattern accurately and to maintain optimum detector height. Furthermore, survey by foot may expose personnel to radionuclides.

Land vehicle mounted survey or prospecting devices are disclosed in the following patents. U.S. Pat. No. 2,562,914, entitled Prospecting, to Herzog, discloses detectors which are mounted on the top of a vehicle. U.S. Pat. No. 3,008,046, entitled Method of and Apparatus for Making a Geophysical and Topographical Map, to Carpenter, discloses a combination odograph, scintillation counter-recorder, and an altimeter-recorder, connected to the wheel of a vehicle.

U.S. Pat. No. 3,124,684, entitled Plutonium Detector, to Eberline, discloses a plutonium detector which is a single unit attached to the front bumper of a vehicle. U.S. Pat. No. 3,341,706, entitled Apparatus for and Method of Terrestrial Surveying, to Swift et al, and U.S. Pat. No. 3,354,310, entitled Mobile Density and Moisture Content Sensing Device for Continuous Logging of a Terrestrial Surface, to Swift, disclose a detector which is pulled on a trailer behind a vehicle. U.S. Pat. No. 4,317,033, entitled Gamma Ray Prospecting System, to Penenka, et al, discloses a gamma ray prospecting system. None of these patents disclose a plurality of independently positionable detectors which follow the terrain as the vehicle moves across the terrain.

Another prior art land vehicle mounted radiation survey device is manufactured by Rockwell International in Richland, Washington, for the Hanford Site. This device, called the "Mobile Surface Contamination Monitor (MSCM)," is a tractor-driven unit with five sodium iodide (NaI) crystal detectors mounted on a rigid horizontal tool bar at the front of the tractor. A sixth (background) detector is mounted at the rear of the tractor on a rear tool bar. Each of the five active detectors is enclosed in a side collimated assembly that limits its field-of-view and does not adequately cover the space between the detectors. Because the detectors are mounted rigidly on a horizontal bar, the detectors are not maintainable at a preselected height above the ground as the tractor moves over the ground because the ground terrain is almost never flat. Thus, the detectors cannot be accurately utilized. The MSCM can only be used for traversing very flat, consistent terrain. In fact, when the tractor tilts, the detectors often hit the ground and can be damaged. If the detectors are to be raised, the entire horizontal bar is raised, thus raising all of the detectors at once. In addition, the MSCM does not automatically mark the "hot" spots. An operator must stop the vehicle, get out of the cab, and physically place flags at the place of contamination. This requires excessive time, results in low marking accuracy, and potentially exposes the operator to radioactivity. Furthermore, the MSCM does not differentiate between one or more radionuclides; it merely detects that gamma or beta radiation is present. The MSCM does not provide for mapping of the survey site. This makes follow-up work, such as radiation clean-up, difficult and inaccurate.

The following patents disclose tractors or other heavy equipment which are used for agricultural purposes, and which provide independent movement of implements. U.S. Pat. No. 2,395,322, entitled Tractor Mounted Implement, to Evans, discloses bars positioned on the back of the tractor, to which two plows are connected. The bars allow the plows to move up and down, independently, when controlled by the farmer. U.S. Pat. No. 2,800,847, entitled Selective Control Mechanism for Tractors, to Bennett; U.S. Pat. No. 3,433,310, entitled Ripper Tooth Mounting for Earth-Working Machines, to Harper; and U.S. Pat. No. 4,248,310, entitled Skip Row Cultivators, to McWilliams, teach hydraulically assisted independent movement of implements attached to a horizontal bar on a tractor, a bulldozer, or the like, by operator control. As stated above, movement of the implements is operator controlled and not automatic, based on the terrain. None of these devices is suitable for carrying a detector device above the ground, nor would any of the above devices allow automatic following by a detector device of somewhat irregular terrain.

The following patents utilize various means for providing location of a mobile receiver. U.S. Pat. No. 3,715,758, entitled Methods and Apparatus for Precise Positioning of Locations, to Sender; and U.S. Pat. No. 4,232,317, entitled Quantized Hyperbolic and Inverse Hyperbolic Object Location System, to Freeny, disclose radio location systems. U.S. Pat. No. 3,918,056, entitled Radar Trilateralization Position Locators, to Merrick; and U.S. Pat. No. 3,938,146, entitled Secure Encoder for Trilateralization Locator Utilizing Very Narrow Acceptance Periods, to Dano, both teach radar location systems. Worth, et al, in "Use of a Commercial Ranging System in Field Surveys of Radioactively Contaminated Sites," presented at IEEE Nuclear Science Symposium (1984), discloses the use of a microwave ranging system.

SUMMARY OF THE INVENTION

In accordance with the invention, there is provided a site survey apparatus for detecting a source material present on a site. The apparatus comprises a ground vehicle, movable and guidable on a selected path, and structure disposed on the ground vehicle for automatically following the terrain and retaining and positioning a plurality of detectors above ground. The structure is capable of positioning each detector at a predetermined height above the ground and in a selected positional relationship to other detectors and maintaining the positions of the detectors as the vehicle traverses somewhat irregular terrain. The detector retaining and positioning structure preferably comprises wheeled carriages, preferably having two wheels each, and detector supports for maintaining the detectors in their selected relationship to one another and at the predetermined height above the ground.

The detector supports preferably provide for automatic upward and downward and swivel movement of the carriages and detectors as the ground vehicle travels over somewhat irregular terrain. The detector retaining and positioning structure is preferably disposed in front of the ground vehicle with deflectors provided thereon.

A detector height adjustability structure can be provided for operably raising, lowering, and positioning the detectors at a predetermined height. Such adjustability structure preferably can raise the detectors well above the ground into a retracted, non-use position. The preferred height adjustability structure comprises two horizontal bars on each of which an equal number of detectors are disposed, a junction wherein the two horizontal bars meet, and means for independently raising each of the horizontal bars upward from the junction, preferably to form a V-shape.

The apparatus can be driver or remotely operable. Shielding and air filtering can be provided to prevent a driver being exposed to the source material. The apparatus can be guided to move over a site in accordance with a predetermined site survey scanning pattern.

The apparatus further comprises means responsive to the detectors for indicating source material areas on the site and can comprise an autolocation system, such as microwave location, inertial guidance, ultrasound location, laser location, radio location, and radar location.

The apparatus can comprise capability for mapping source material areas on the site, for example, using coordinate locations for source material areas, means for indicating distance of ground vehicle travel from a starting point, or dead reckoning. The mapping capability can be used to generate, for example, a linear data display indicative of detected source material as a function of distance from a starting point and to produce a visual depiction of source material areas on the site. Source material location can be indicated by visual markings, such as with paint.

Qualitative and quantitative assessment data regarding source material areas can be generated and stored using a computer. The computer can be disposed on the ground vehicle. Source material samples can be collected for assessment using, for example, a tube system or an auger system.

The source material can comprise radionuclides, toxic materials, hazardous materials, chemical materials, minerals, ores, metals, oil-containing materials, fuel reprocessing materials, tailings, and the like.

If the source material is a radionuclide, the detectors, such as scintillation detectors, solid state detectors, and germanium detectors, and the like, can be capable of detecting alpha particles, beta particles, gamma rays, x-rays, and neutrons. Detector assemblies for detecting radionuclides are preferably conical shaped, flaring outwards towards the ground.

Metal detectors for detecting metals; neutron activation source detectors for detecting ores, minerals, and tailings; and gas detectors for detecting toxic materials, hazardous materials, chemical materials, oil-containing materials, tailings, and fuel reprocessing materials; are useful in accordance with the invention.

The invention also comprises a site survey apparatus comprising a ground vehicle, a plurality of implements associated with the ground vehicle, and terrain following structure disposed on the ground vehicle for providing each of the plurality of implements to be positioned in a selected relationship to the others and for automatically substantially maintaining a determined height above ground for each implement as the ground vehicle moves over somewhat irregular terrain.

The invention additionally comprises a method for detecting a source material present on a site. The method comprises the steps of:

a) providing a ground vehicle comprising detection means responsive to the source material;

b) scanning the site for the source material by traversing the site with the ground vehicle and the detection means; and c) providing within the ground vehicle structure responsive to the detection means for generating assessment data regarding any source material containing areas, the assessment data comprising the types and quantities of any source material detected on the site.

The step of mapping the location of any detected source material using Cartesian coordinates or the like can be provided by mapping the path of the ground vehicle and any locations of detected source material. Prior to step a), an aerial survey to determine site boundaries can be performed. Background data can be compensated for or eliminated with the software and hardware of the invention.

It is therefore one object of the present invention to detect source material areas on a site, particularly radioactive areas, and provide marking, mapping, and display of the source material areas.

It is another object of the invention to rapidly and economically provide accurate analysis, mapping and display of quantitative and qualitative data of the source materials.

One advantage of the present invention is that detector height and position can be easily maintained over varying terrain.

Another advantage of the invention is that personnel can safely monitor the position and activity of source areas.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention.

FIG. 19 shows a preferred process of the present invention, using autolocation.

DETAILED DESCRIPTION OF THE PREFERRED EMBODIMENT OF THE INVENTION

Figure 1:
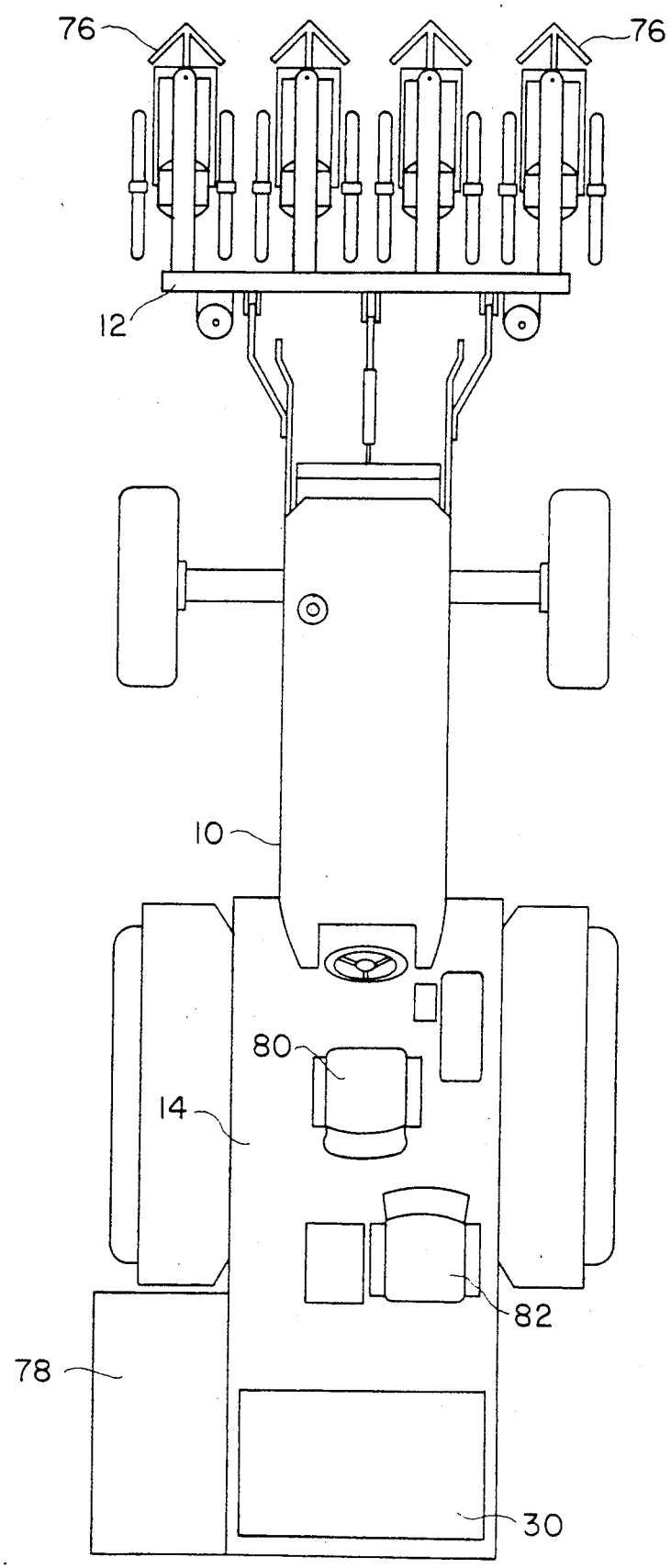
FIG. 1 is a top view of an alternative embodiment of the invention showing optional deflector shields.
Figure 2:
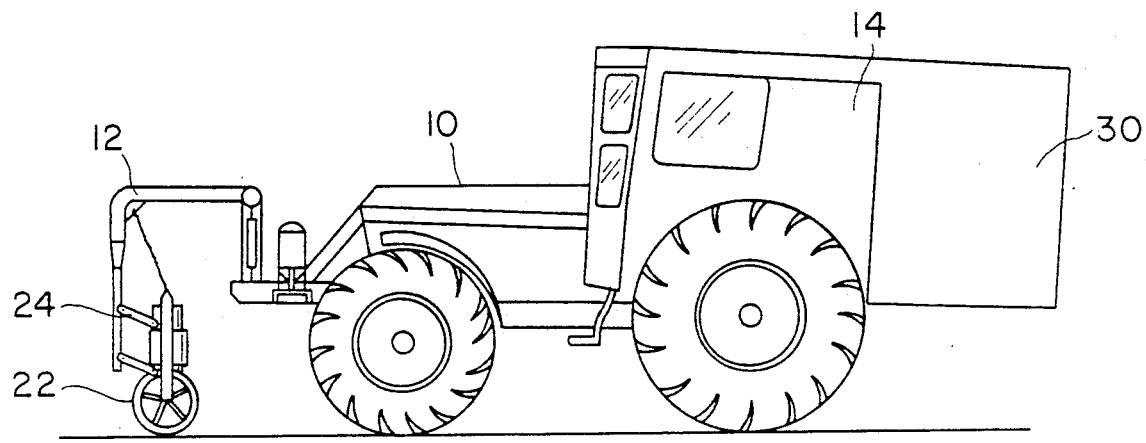
FIG. 2 is a side view of the preferred embodiment of the invention, the other side being essentially the same.

As seen in FIGS. 1-7, the preferred embodiment of the invention comprises a commercially available tractor type ground vehicle 10 which is conventional in design and suitable for traversing somewhat irregular terrain, a detector carrying apparatus 12 and a cab 14 which houses a computer 30. The detector carrying apparatus 12 and cab and housing 14 are preferably mounted front and rear to counterbalance each other so that the ground vehicle 10 handles well and remains stable while in motion over somewhat irregular terrain. The ground vehicle 10 is preferably appointed for conventional operator controlled driving capability, but it can be additionally or alternatively equipped with commercially available remote control devices, if desired.

The ground vehicle 10 can be a four-wheel drive vehicle so that it can be more easily driven over varying terrain. The ground vehicle 10 should have good ground clearance so that it is not stopped by rocks or other obstructions on the site. If there are plants or other objects, such as sagebrush, which might interfere with detection, optional deflection shields 76 (shown in FIG. 1), similar in appearance to cowcatchers, may be provided in front of detectors 16.

The housing of cab 14 is preferably large enough to accommodate two people, such as an operator (seat shown as 80) and technician (seat shown as 82), if the ground vehicle 10 is to be personnel driven. Forced air flow can be included in the electronics enclosures in the cab 14 with provisions for dumping hot air in the summer to the outside and redirecting it to the cab 14 in the winter. The air inlet to the cab 14 preferably has a dust filter and the cab 14 is either sealed or pressurized to prevent dust infiltration. The vehicle engine is useful to provide climate control (heating and cooling) of the housing and cab 14. If radiation is to be detected, the cab 14 can be provided with a lead shield (not shown) to protect the occupants.

The ground vehicle 10 can provide some of the power requirements; however, additional power generation, such as AC power generation is also useful in accordance with the invention. Additional power generation can be supplied by various means, such as a standard gasoline generator, a generator driven by the ground vehicle 10, or an alternator/inverter system. In any event, constant power usually is needed to maintain a computer memory. FIG. 1 illustrates a compartment 78 positioned on one side of the ground vehicle 10 for positioning a generator.

Figure 4:
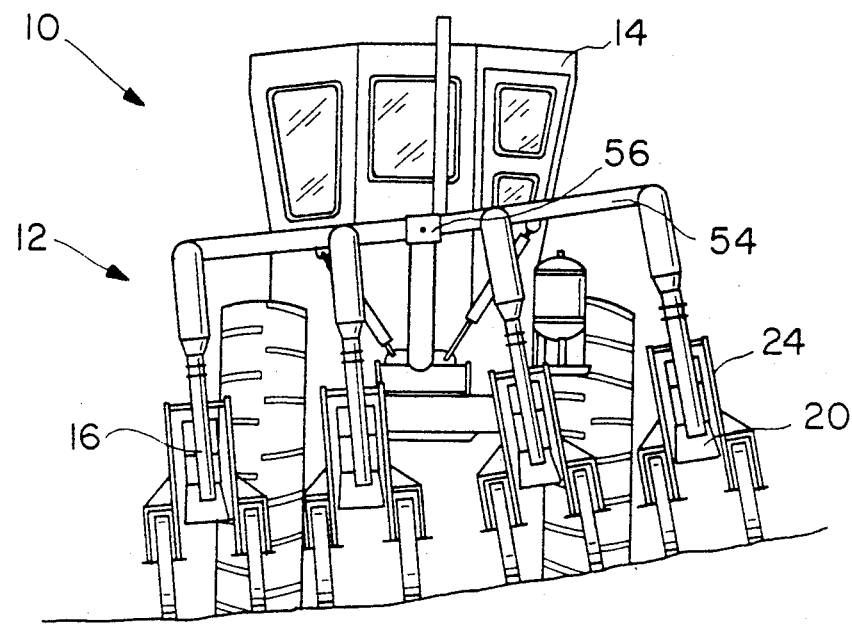
FIG. 4 is a front view of the embodiment of FIG. 2 showing the detectors following somewhat irregular terrain.
Figure 5:
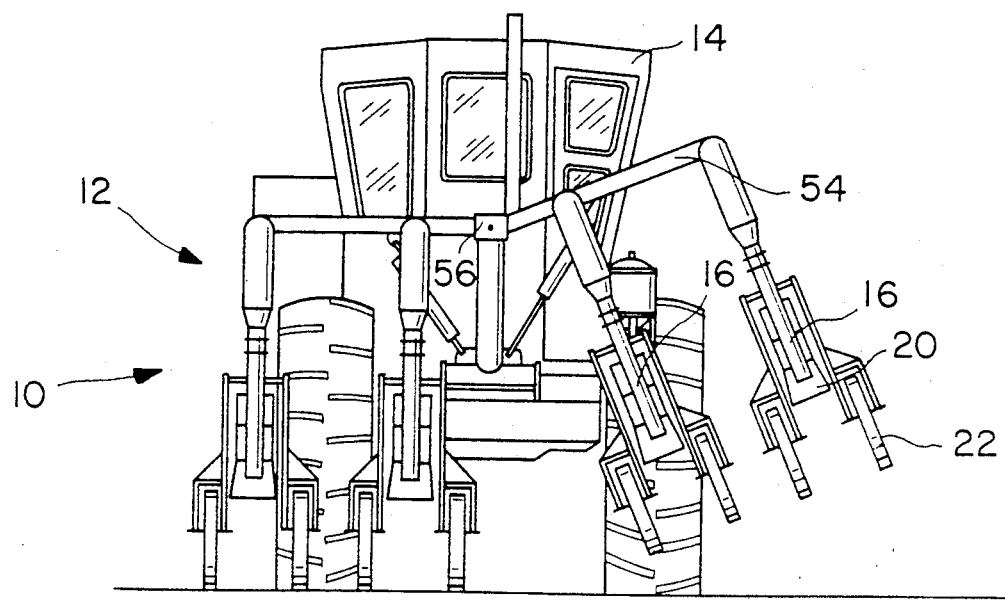
FIG. 5 is a front view of the embodiment of FIG. 2 showing two detectors raised for very irregular terrain or for maintenance.
Figure 6:
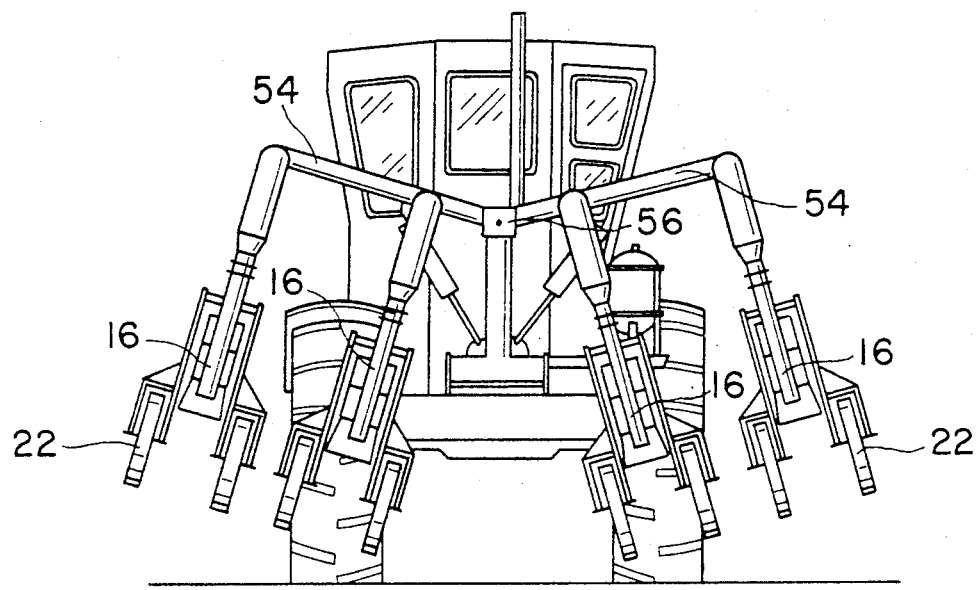
FIG. 6 is a front view of the embodiment of FIG. 2 showing all detectors raised for very irregular terrain or maintenance.
Figure 7:
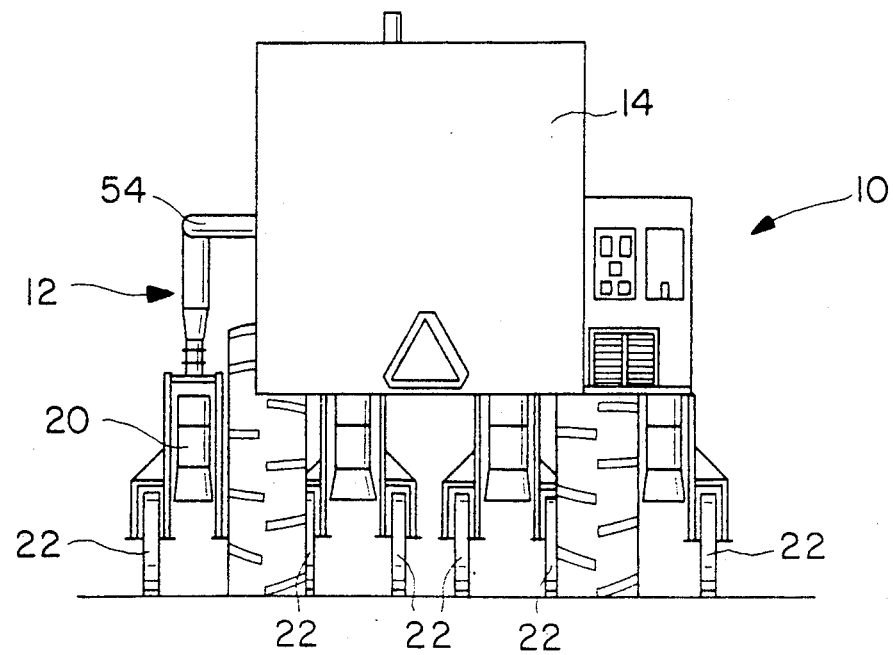
FIG. 7 is a rear view of the embodiment of FIG. 2.
Figure 8:
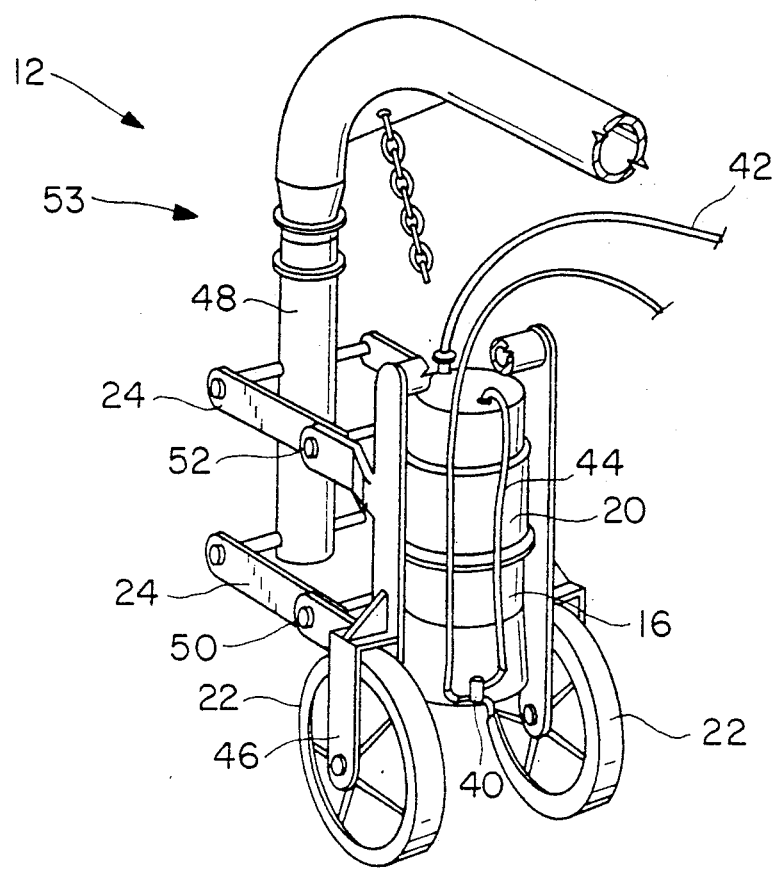
FIG. 8 is an isometric view of a detector and source area indicating structure of the FIG. 2 embodiment.
Figure 9:
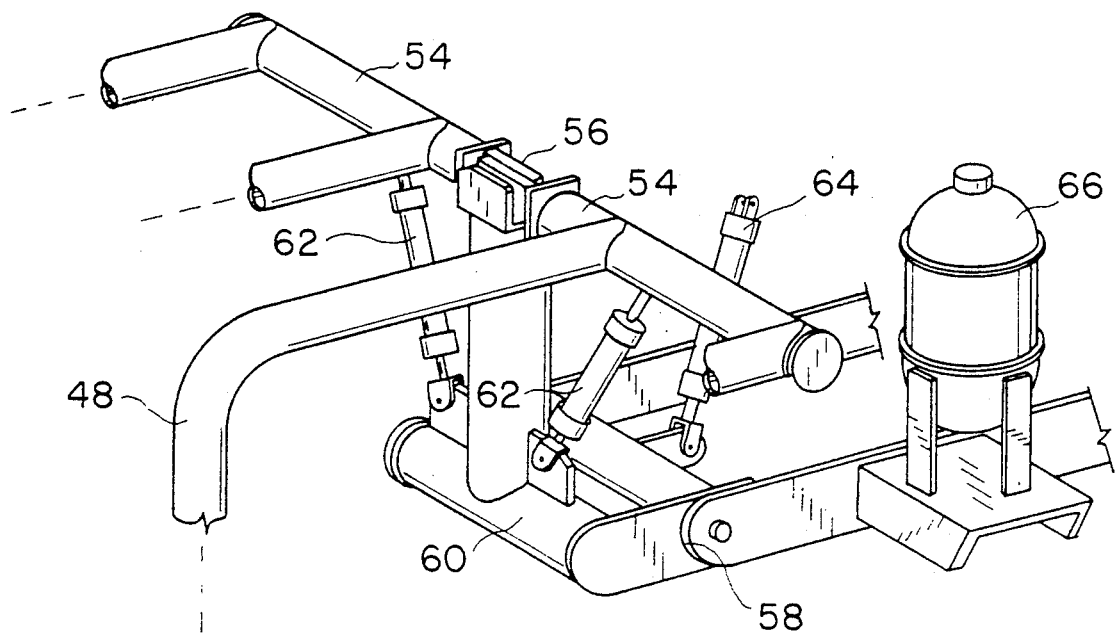
FIG. 9 is an isometric view of a horizontal support structure and paint container of the FIG. 2 embodiment.

The detector carrying apparatus 12 comprises structure for retaining and positioning a plurality of detectors 16, wheels 22, and a detector suspension structure 24 for maintaining the detectors 16 at a predetermined height above the terrain as the ground vehicle 10 travels thereacross. As used throughout the specification and claims, the term "detector" is intended to include the detector itself and/or the detector assembly. In the preferred embodiment, two wheels support each detector 16. FIGS. 8 and 9 show various features of the detector carrying apparatus 12. The carriage structure 46 supports each detector 16 or detector casing and the detector suspension structure 24 on a pair of wheels 22. The detector suspension structure 24 attaches the carriage structure 46 to a central post 48. The detector suspension structure 24 has several joints 50 and 52 which allow the wheels 22 and support carriage 46 to follow, in a vertical upward and downward motion, somewhat irregular terrain. Swivel means 53 are provided on the central post 48 to allow the detectors to turn or swivel sideways to compensate for somewhat irregular terrain. Preferably, an alarm is provided to the operator, if any of the detectors 16 are at a level which is too high or too low to the ground or if a detector 16 swivels too far, due to the terrain. As shown in FIG. 9, each central post 48 joins to a horizontal member which in the preferred embodiment comprises two horizontal posts 54. In the preferred embodiment, shown in FIG. 9, the horizontal posts 54 join at a central joint 56, so that each of the horizontal posts 54 can be independently raised upward. FIG. 5 shows two detectors 16 raised on one of the horizontal posts 54. FIG. 6 shows all detectors 16 raised. When both of the horizontal posts 54 are substantially raised upward, they form a V-shape. Movement of the horizontal posts 54 may be automatic, when fairly irregular terrain is encountered (see FIG. 4), or by operator control if substantial movement is desired. Likewise, the entire horizontal member can be raised or lowered by a joint 58 disposed on a tractor support carriage 60, to position the detectors or provide for maintenance. Hydraulic cylinders 62 and 64 provide for substantial movement, by operator control, of the horizontal posts 54 and the tractor support carriage 60. Reasons for operably raising the horizontal posts 54 and the tractor support carriage 60 include lifting the detectors 16 substantially above the ground for very irregular or rough terrain, or for maintenance of the detectors 16 or any other parts of the apparatus.

Figure 10:
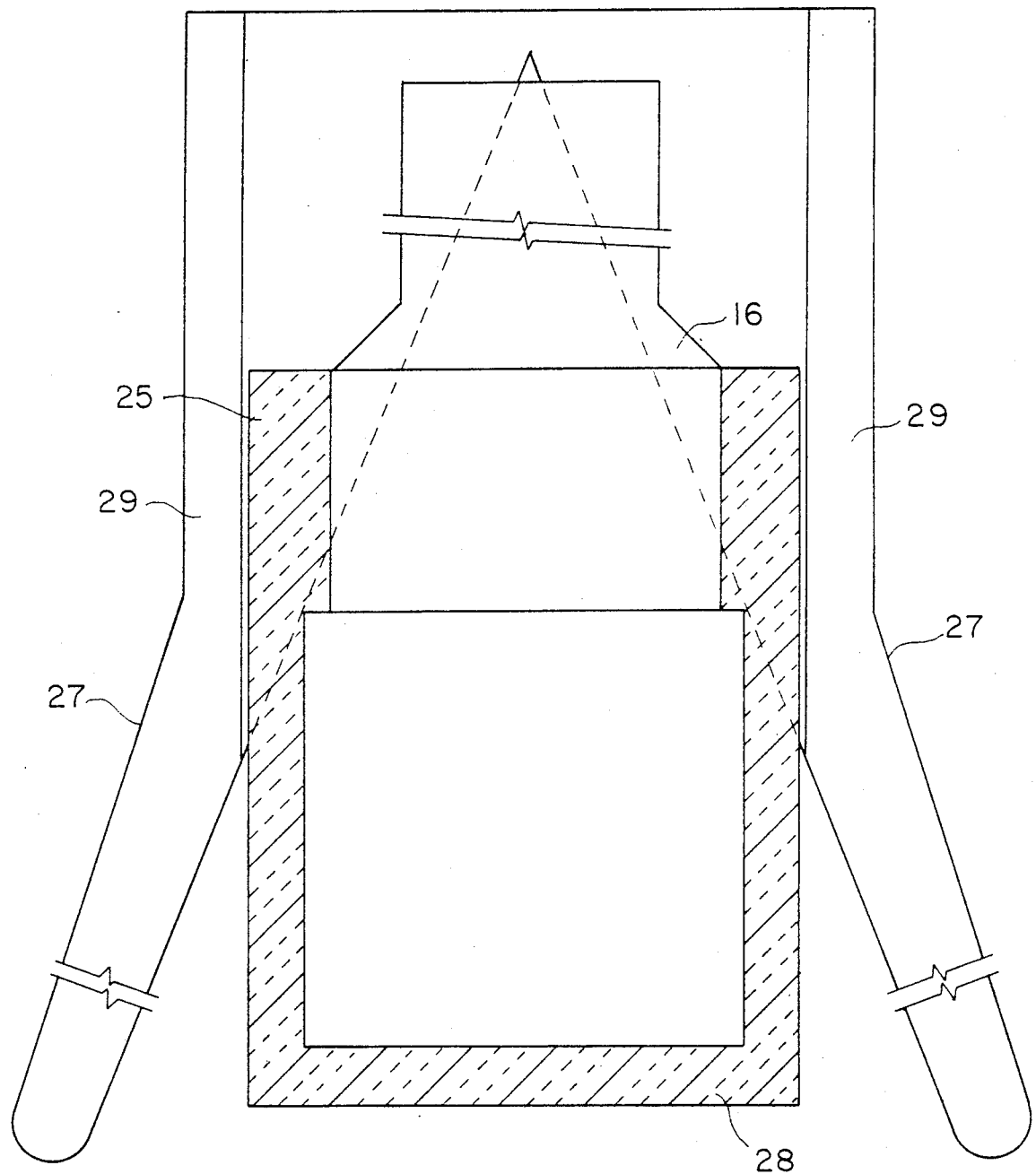
FIG. 10 is a front view of an alternative conical wall shape detector shield for use in the present invention.

The particular detectors 16 used in practicing the invention should be selected to be useful for finding whatever source material is to be detected. For example, if it is desired to detect radionuclides, the detectors must be able to detect radiation. Radiation detectors may be sensitive to alpha, beta, gamma, x-ray, and/or neutron radiation, depending on the particular site. For example NaI(Tl) doped scintillators and solid state detectors are useful for detecting gamma- and x-rays. A germanium detector is useful for detecting low energy photon radiation. Likewise, many alpha, teta, gamma, and x-ray detectors, common to the art, such as manufactured by Canberra, Inc., EG&G Ortec, Princeton Gamma Tech, Bicron, and Harshaw, are useful radiation detectors in accordance with the invention. FIGS. 8 and 10 illustrate a preferred detector 16, useful in accordance with the invention, for detecting radionuclides. The detector 16 shown in FIG. 8 is enclosed within a protective somewhat conical shield 20. FIG. 10 illustrates an alternative shield 27 in which the detector 16 is enclosed within a more conical shield 27. The conical shape of the detector shields allow for a wider area of detection, and for a thorough scanning of all areas between detectors and minimizes the effect of radiation angle of entry. FIG. 10 also illustrates an interior can or shell 25 in which the detector 16 is seated, preferably in a foam overpack. For detecting radiation, with the detectors illustrated in FIGS. 1–10, the detectors 16 are preferably spaced about two feet apart and positioned approximately 10" to 12" above ground. Radioactive Ra226, for example, can be detected up to depths of up to 18".

Other detector or shield shapes may also be utilized in accordance with the invention. The type and design of detector depends, of course, on the source material thought to be present on the site. The detectors should be capable of withstanding normal mechanical shocks and vibrations, and temperature changes. A detector may be enclosed in a high density urethane foam overpack 28 (in a can or shell 25), such as shown in FIG. 10, to aid in making the detector shock and temperature-change resistant. Heaters, such as low density neoprene thermostatic heaters, may be provided to control the temperature of each detector and thereby achieve reliable detector performance at below-freezing temperatures. FIG. 10 also shows lead shielding 29 for a radiation detector 16. The detectors should be placed substantially equidistant from one another so that the site can be adequately scanned, on one pass. The detectors used can be selected to provide qualitative and quantitative data.

For metal detection (e.g., forensic work or archeological work), the detector of the invention may comprise a metal detector. For minerals or ore exploration or prospecting, the detector system may comprise a neutron source and NaI detectors to bombard the ground at predetermined locations to provide, for example x-ray or gamma-ray data. For hazardous, toxic, landfill, or chemical sites, the detector may comprise a gas detector, which may be disposed on the ground vehicle for detection of gases leaking above ground, or inserted into a hole made by the apparatus of the invention. As can be appreciated by those skilled in the art, the type of detector selected for use depends on what source material is to be detected and analyzed, and the invention is not limited to the specific detectors described herein.

Other data-collection equipment, such as collection and permanent recording of barometric pressure, rainfall, and equipment status, and the like, can be provided in accordance with the invention. Such data may be important for calibration, correction, or data interpretation.

Figure 11:
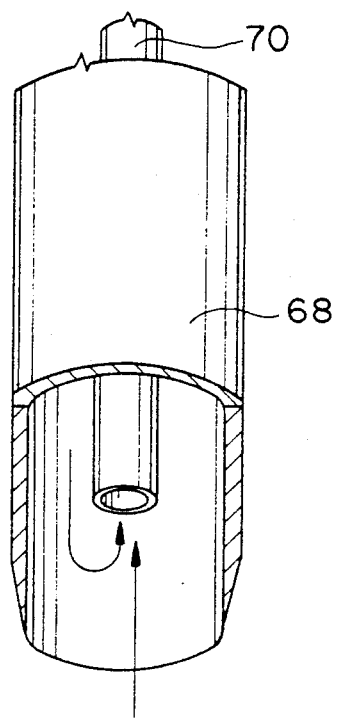
FIG. 11 is an isometric view of a sample obtaining structure, a tube system, of the present invention.
Figure 12:
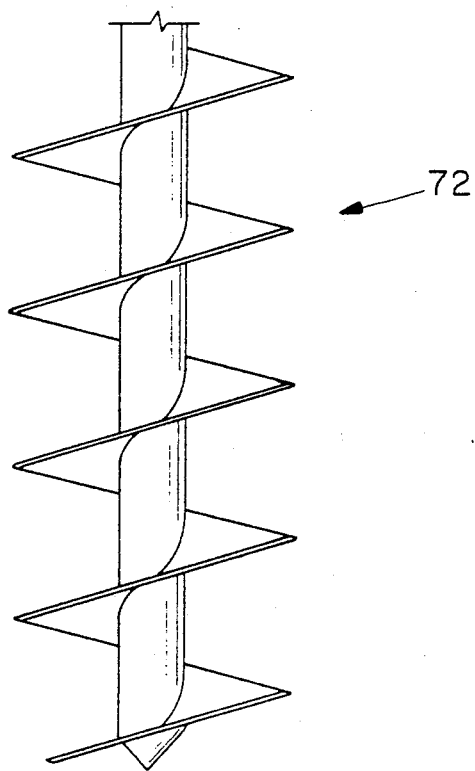
FIG. 12 is an isometric view of an alternative sample obtaining structure, an auger system, of the present invention.

The apparatus of the invention is useful for detecting, scanning, characterizing, and verifying various source materials, such as radionuclides from radioactive waste sites; materials present at chemical (volatile and nonvolatile) or radiation accident sites, test sites, tailings sites (including blowing tailings), landfill sites, archeological sites, forensic sites, and fuel and reprocessing sites; toxic wastes; hazardous wastes; chemical wastes; metals; minerals; ores; and oil-containing materials. As can be appreciated by those skilled in the art, the invention is not limited to radiation detection. The term "detector" used throughout the specification and claims is intended to include not only a structure which can actually detect the presence of source materials (such as the detectors shown in FIGS. 1–9 and discussed above), but also structures which provide means for detecting source materials. For example, the apparatus of the invention may be useful for providing drilling or sampling locations at predetermined locations. The "detectors" may provide for drilling or sampling so that a sample (gas, liquid or solid) is collected which can then be detected or analyzed. FIG. 11 illustrates a preferred sampling embodiment of the detector of the invention. A tube 68 is hydraulically driven into the ground to a selected depth for sample collection or in-situ analysis. The tube 68 can be rigid or somewhat flexible, but must be sturdy. In particular, the tip of the tube 68 should be hard, to allow for penetration of the ground. The tip of tube 68 could be of a flexible nature and be pulsed to increase the penetration of the tube 68 into the ground. For sample collection, an inner tube 70 may accompany the lowering of the tube 68 into the ground or be subsequently lowered into the tube 68 after the tube 68 has penetrated the ground. If gas is to be collected from the ground, the tube 68 may be flooded with a non-reactive and ground based gases, such as nitrogen, helium, neon, or the like, which acts as a carrier for the gas to be sampled from the ground and which flows up into the inner tube 70. The arrow shows the direction of travel of the non-reactive and ground based gas. After the sample is collected, the tubes 68 and 70 are withdrawn from the ground. For in-situ analysis, an analysis probe may be inserted into the hole obtained by the tube 68 to provide qualitative and/or quantitative analysis. FIG. 12 illustrates an alternative embodiment for collecting a sample or providing in-situ analysis, wherein a drilling device, such as an auger 72, drills a hole in the ground for sample collection. As in FIG. 11, a collection tube 74 could then be lowered into the ground to collect the sample. The auger 72 could be rotated using, for example, a hydraulic motor, a pneumatic motor, an electric motor, or other mechanical means common to the art. Soil collected by the auger 72 during drilling of the hole could be carried up the collection tube by various means common to the art, including an internal or external screw system, or via entrainment in a moving air column created by pressurized air, returning through another tube. Soil taken to the top of a sampling tube system could be passed to the cab 14 for analysis via plastic tubing and air entrainment, or by other mechanical means. Within the cab 14, this soil could be analyzed by various means common to the art, including chemical, physical, and electronic means. For example, flame ionization techniques are readily available, and are accurate methods for evaluating the presence of metals and other contaminants in a small soil sample. Such systems are readily portable, and could be easily operated in the cab 14. Other ground penetration means, common to the art, such as a scoop or shovel system, are useful in accordance with the invention, for providing sample collection. Means for stopping the penetration (e.g., if the device hits a rock), such as a rate-of-pressure-change sensor, are useful in accordance with the invention, for preventing damage to the penetration device. Means for cleaning the penetration device or probe to eliminate the possibility of contamination of subsequent samples is also useful in accordance with the invention.

The ground vehicle 10 is preferably stopped during any sampling procedure. The ground vehicle 10 can be stopped at predetermined sampling locations, or it can automatically stop when a source material is detected. Those skilled in the art will recognize that the detector may comprise both sampling and analysis features.

Figure 3:
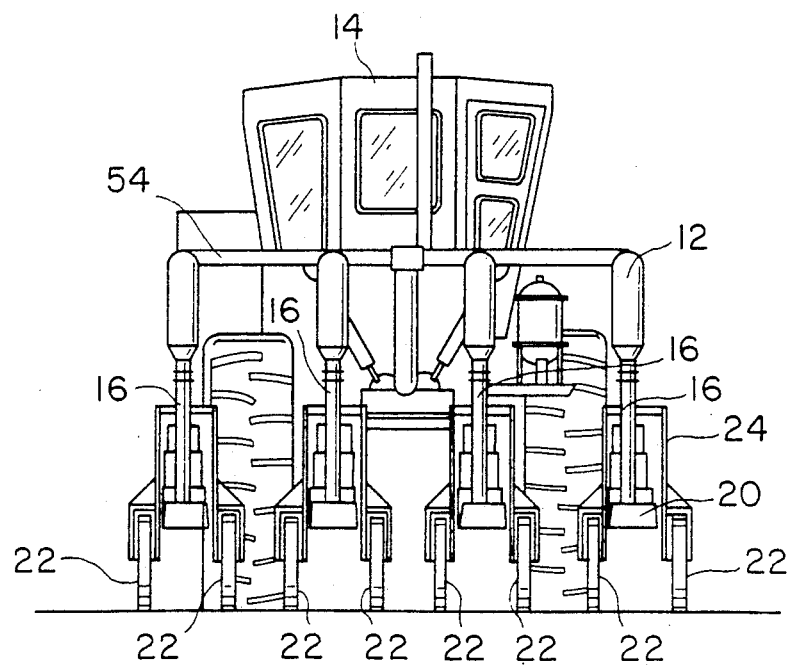
FIG. 3 is a front view of the embodiment of FIG. 2.

Each detector 16 of the apparatus of the invention is capable of independent motion (vertical, pitch and yaw), that is, it is able to follow somewhat irregular terrain, such as when the ground vehicle comes upon bumps, hills, or rocks. By following the terrain, the detectors 16 are positioned at essentially the same height above ground as they move along the terrain. This provides for more accurate measurements. Movement of each detector 16, in the preferred embodiment of the invention, is accomplished by joints 50 and 52 on the support carriage 24, which automatically allow the detectors 16 to move up and down, thereby maintaining detector-to-ground spacing, minimizing potential detector damage and enhancing the photon angle of incidence (for radiation detectors) to the detector. FIGS. 1-8 illustrate detectors 16 mounted on wheels 22 which follow the terrain and thus provide a consistent height. FIGS. 3-6 show various front views of the ground vehicle 10 and detectors 16 to illustrate its terrain-following features. FIG. 3 shows the detectors 16 on fairly even ground. FIG. 4 shows the detectors 16 on somewhat irregular terrain (note that as the ground is lower, the detectors 16 drop). FIG. 5 shows the detectors 16 substantially raised by one of the horizontal bars 54. FIG. 6 shows all detectors 16 substantially raised, by raising both horizontal bars 54. Raising the detectors 16, as shown in FIGS. 5 and 6, is useful for vehicle travel over very rough terrain, terrain which is not to be detected or analyzed, or for maintenance purposes (such as changing out detectors 16).

An area indicating structure is preferably disposed at each detector 16 to mark source material areas, and also to provide reference points for engineering measurements (elevations, etc.). FIG. 8 illustrates the preferred area indicating system, in accordance with the invention, which comprises a paint spray delivery system. A paint spray valve 40, disposed on each detector 16 or detector casing, individually controlled, automatically marks locations for source materials as they are detected. One line 42 provides the paint to the paint spray valve 40, preferably a solenoid controlled valve, and an electric line 44 provides for opening the paint spray valve 40. FIG. 9 shows a paint container 66 for storing the paint. This container 66 is preferably air pressurized to force the paint out the spray valve 40. As stated above, the paint spray system can also be utilized for providing reference points. Alternatively, an additional paint sprayer (not shown), which is not associated with any particular detector, may be utilized to provide reference points or to mark quality control sample areas. The paint utilized can be water-soluble polymerizing, or another solvent type, or non-water soluble, to prevent loss of paint marks due to rain. The paint delivery system can be used for providing substances which will bind or neutralize the source material, if the source material is present on the ground surface, to aid in clean-up activities. This paint spray system is a great advantage over the prior art in that the operator does not need to stop the ground vehicle and get out to mark the spot. Thus, the operator is not exposed to any possible contaminants, and the ground vehicle can continue to move.

An operator within the ground vehicle 10 can actually drive the vehicle over the terrain to be mapped or the vehicle can be remotely controlled to traverse the chosen terrain. Likewise, in areas in which the ground vehicle 10 cannot proceed (e.g. near buildings, gullies, or tight corners), the apparatus of the invention can be used in conjunction with a more portable unit, such as a backpack unit, which transmits data from these "difficult" areas to the ground vehicle computer or central computer.

Figure 13:
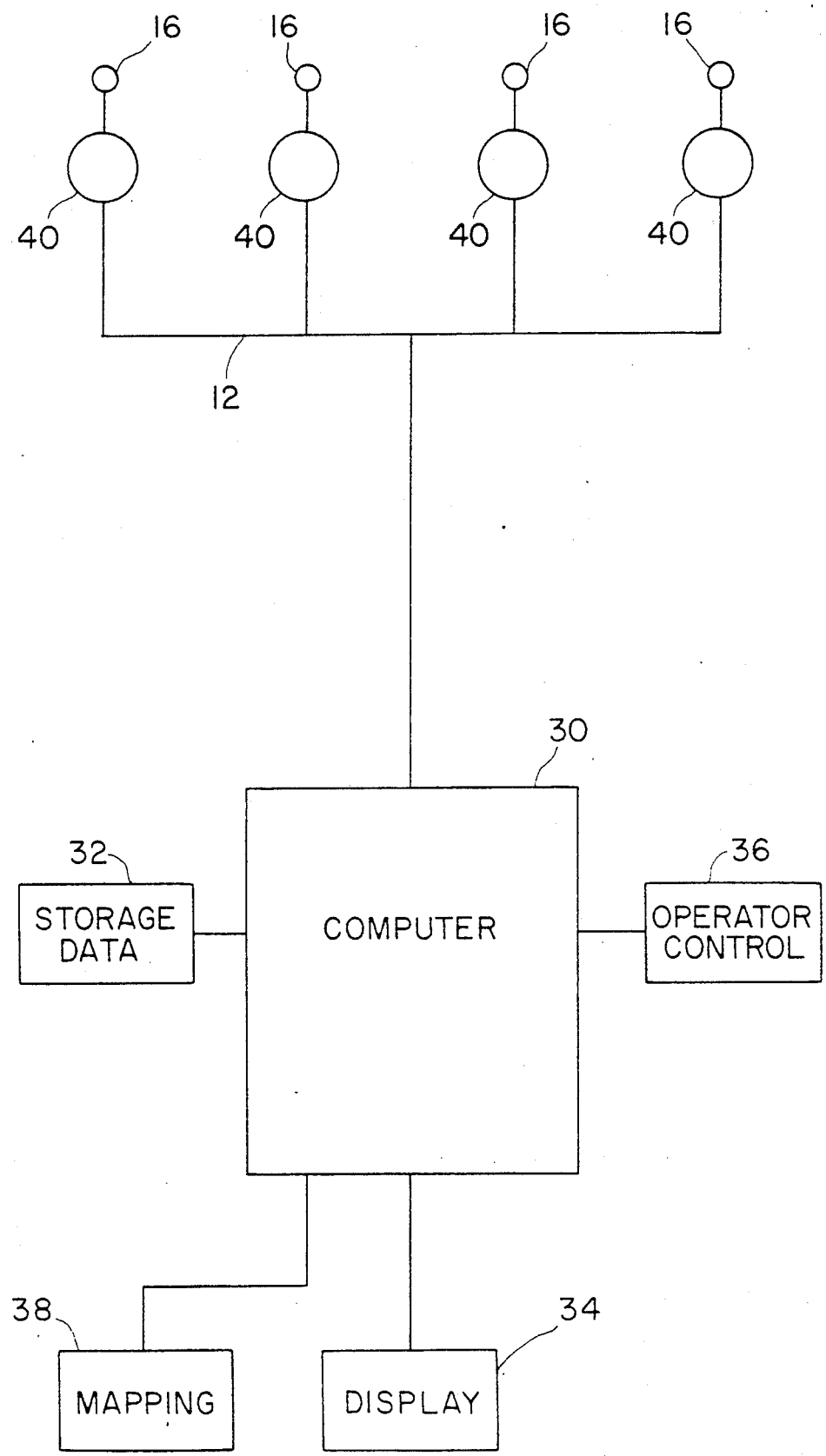
FIG. 13 is a block diagram representative of various features of the preferred embodiment of the invention.
Figure 14:
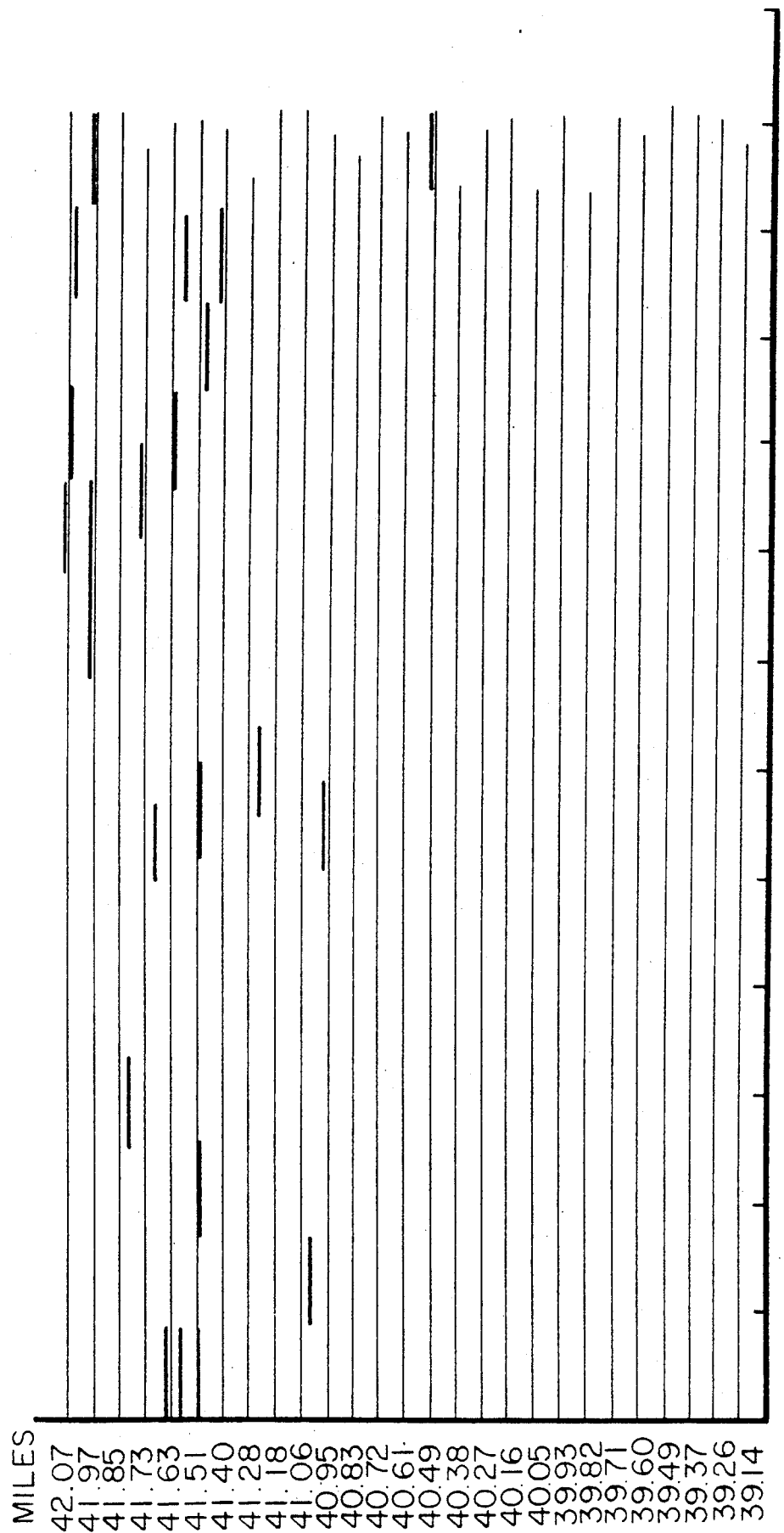
FIG. 14 shows a scan path of the preferred embodiment where few radiologically active areas were detected.
Figure 15:
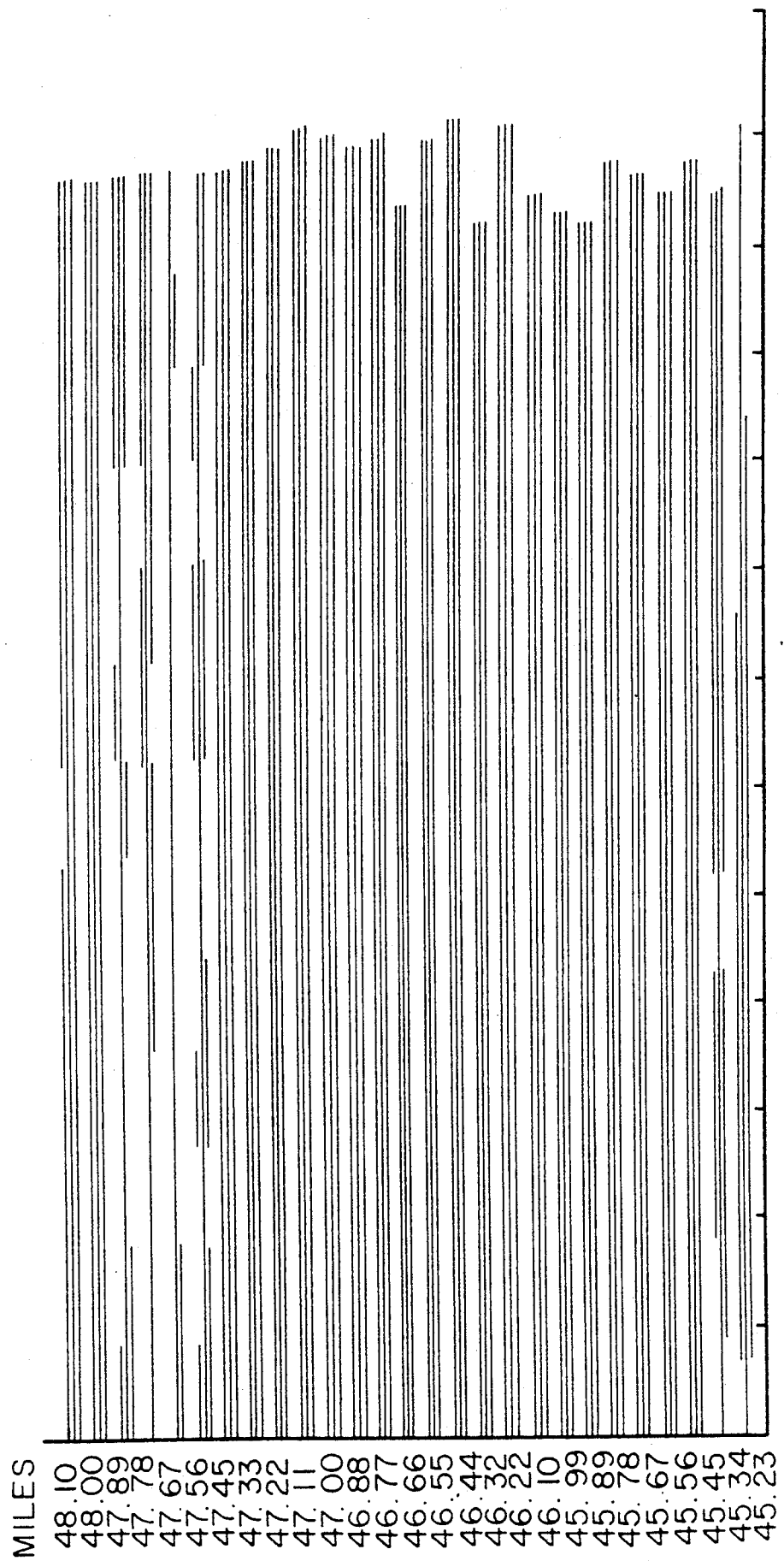
FIG. 15 shows a scan path of the preferred embodiment where many radiologically active areas were detected.
Figure 18:
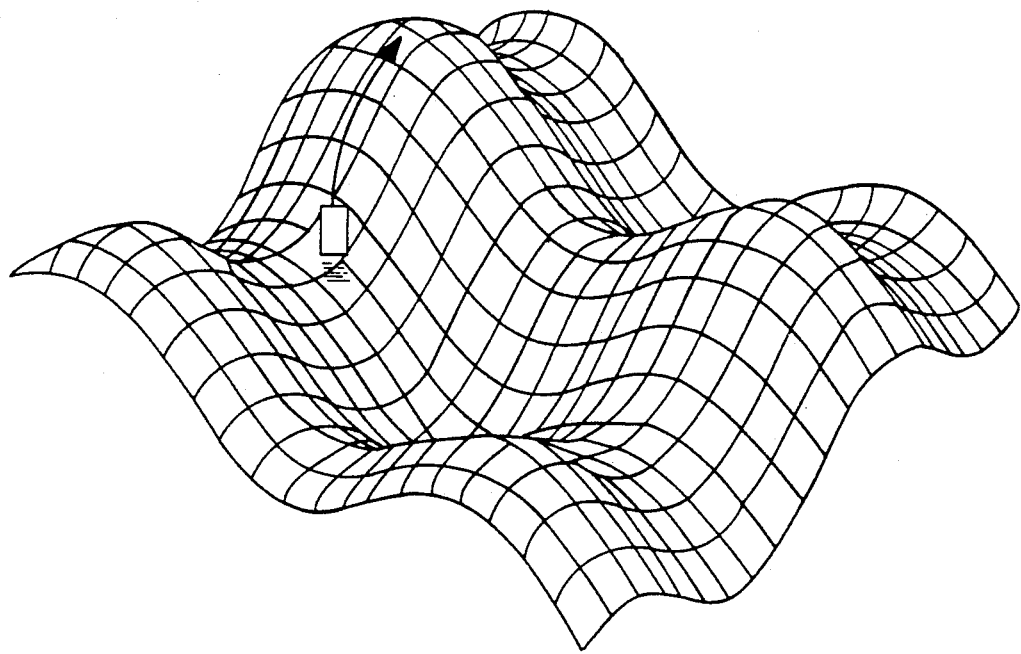
FIG. 18 shows a three-dimensional map of the ground vehicle path and data.

FIG. 13 schematically depicts the invention in block form showing a computer or central processing unit (CPU) 30 having a data storage structure 32, which can comprise, as desired, floppy and hard disks, and tape storage devices. The CPU 30 of the preferred embodiment comprises an IBM or IBM-compatible PC AT, but may comprise any suitable hardware in combination with software capable of performing the desiderata of the invention. Those skilled in the art will recognize that known hardware such as an EG&G interface/controller is useful in practicing the invention. The computer 30 and its associated software used should be capable of: 1) providing the position or location (mapping) of source materials, such as radiologically active areas, on a site as the site is scanned in a number of desired ways, such as by scanning over a grid as shown in FIGS. 14 and 15 (two-dimensional) or FIG. 18 (three-dimensional), to provide Cartesian coordinates, a vector (distance and direction) from a chosen point, and the like; 2) determining what type of source materials are present (qualitative); and 3) determining the amount of the source materials present (quantitative), and preferably determining concentrations of each source material independently. The software can be selected to make maximum utilization of detector features, which can include qualitative and quantitative assessment. Maps or plots can be generated to show such data in practicing the invention. A display 34 and an operator input device such as a keyboard 36 can also be provided. Thus, a map can be depicted on the display 34 as well as a "hard copy" via a plotter 38 disposed within the machine or at a remote location to which survey data can be transmitted by radio or otherwise. On-board graphics capability (preferably color graphics) is useful for providing timely report quality data illustration, eliminating the need for data transfer and rehandling, and providing the operator with real-time feedback, for example, a conventional or projected video display. On board laboratory analysis equipment, such as devices for spectrographic analysis, atomic absorption, x-ray diffraction, gas chromatography, flame ionization, spectrophotometry, inductively coupled plasma, fluorescence techniques, and the like, may be provided in the cab 14 to provide analysis of the source material detected and/or sampled.

The preferred software, useful in accordance with the invention, falls into three major functions groups: 1) system setup and checkout; 2) operation; and 3) data reporting. For the radiation detection embodiment, the system setup and checkout programs allow the user to setup/adjust the data acquisition system by collecting data and displaying the data in a manner that allows the user to determine if the amplifier gain, ADC zero, and other variables are properly set, and to evaluate detector resolution and system response. Output to the user includes count rate in the regions normally monitored as well as a user moveable cursor that provides data channel number and count rate in that channel. The software allows the operator to perform high voltage plateau measurements for each of the detectors and to calibrate location. The operations software sets up the system for scanning by requesting operator input of the survey parameters which control the type of survey, calculations of results, area to be surveyed, and options such as painting and activity levels to be graphically differentiated. Four types of surveys are supported for radiation detection: 1) radiological assessment with coordinate locations appended to the data; 2) radiological assessment with distance from a starting point appended to the data; 3) radiological assessment with "dead reckoning" position information; and 4) verification surveys with coordinate locations and quality control sample location/numbering. The second and third survey options may display the detector data sequentially using calculated positions. The first and third survey options may display data using actual coordinate locations obtained from the autolocation system. Individual detector results may be printed in varying colors. The operator can choose to paint the presence of source materials. The raw data count is converted to activity using previously input detector constants and stored in virtual memory. The operator may then choose to save the data on disk, tape, etc., or not. Stored data files include detector setup factors and the survey area boundaries as well as individual detector data and specific location information for each set of readings. Verification data files also include quality control sample numbers associated with the detector readings for those samples. Report generation software falls into three categories: 1) a point by point map of the stored data using detector information and a Cartesian coordinate system; 2) a linear display of data which graphically represents in-situ activity as a function of distance from a starting point; and 3) averaged area reporting in which data is averaged over an area and that result is mapped on a Cartesian coordinate system. In the latter example, associated files are also generated to provide input to a database using a standardized grid area number system and quality control sample numbering system. In the preferred embodiment, several differing algorithms are used to provide data management and output. For converting raw count data to soil activity, a simple linear expression of the form $y = cx + b$ is used, wherein y equals soil activity, x equals count rate, b equals background count rate and c is a calibration constant. Graphics display involves conversion of the individual pixels on the screen to coordinate values that correspond to the real world coordinate system being used. Data is plotted not only by coordinate location, but also by direction so that the detector left/right orientation is preserved. That involves not only calculating slope, but also direction of travel along a line. An algorithm checks coordinate data for validity (reflections and range hole cancellation) and to correct impossible locations using previously averaged slope, distance an direction data. The software may control the autolocation system. In the preferred embodiment, the on-board counting electronics are capable of detecting the characteristics of several different types of source materials. The software or computer program listings used in accordance with the invention are appended hereto in the form of microfiche and are hereby incorporated by reference into the specification. As can be appreciated by those skilled in the art, the invention is not limited to the specific software functions outlined above. Embodiments for the detection of other materials, such as chemicals, would utilize specific setup and quality control procedures different from the above.

In the preferred embodiment, analysis is provided to identify, quantify or eliminate interfering background data. For example, fertilizer contains natural radioactivity which would interfere with detector accuracy. Adequate analysis also helps to improve and expedite characterization of anomalous data. A built-in spectrum stripping protocol may be utilized in accordance with the invention to correct results for the presence of interfering source materials, either naturally present or of other types.

During an initial scan of an area suspected to contain source materials, the software is preferably calibrated, using existing soils taken from the site. These areas can be identified by running the operating apparatus over the surface to identify a range of source material concentrations. By extracting samples of the soil from the scanned area, these samples can be analyzed by a qualified laboratory for source material concentrations. The results are used to establish the ratio of the detector count rate versus the reported laboratory results, over the range of concentration interest. Calibration is not limited, in accordance with the invention, to the methods described above.

Figure 17:
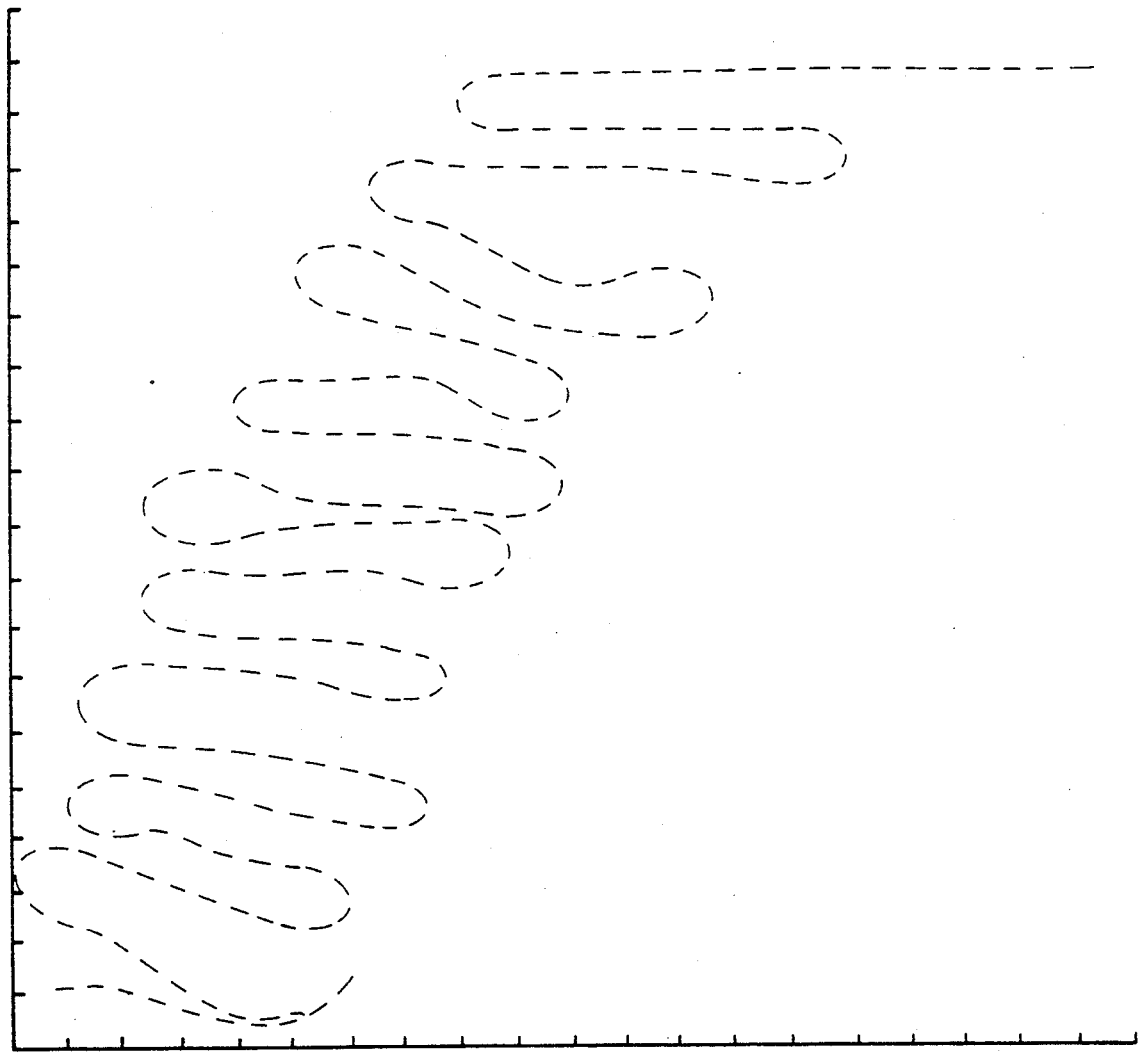
FIG. 17 shows a scanning path of a ground vehicle in accordance with the invention.

After calibration is completed, the system is preferably run in one of two methods during initial scanning of an area. In the first method, the apparatus can scan back and forth, in wide sweeps, over the suspected perimeter of the source materials, to establish the boundaries containing the source materials, and provide information on specific source material concentrations. This approach provides information to allow for estimation of the size of the site and for planning. Locations of source materials can be provided by the indicating structure (paint spray). FIG. 17 illustrates such a scanning path with the "fuzzy" areas indicating radiation emitting areas. In the second method, the apparatus scans the entire site. This approach to an initial survey takes more time, but provides a complete record of source materials, allowing follow-up action to take place immediately.

A ranging and tracking system is preferably utilized in accordance with the invention to provide coordinates of the survey site and location of source materials, once detected. The preferred ranging and tracking system of the invention comprises: 1) a central section including a microprocessor-based ranging control and computational unit, at least two receiver/transmitters, and necessary interconnect cables. The microprocessor-based ranging control and computational unit preferably contains a power supply and relevant hardware, including the microprocessor and range clock (e.g. 150 MHz range clock), to control the receiver/transmitters for the measurement of ranges and transferring of data, for all computations and for remote control by another computer. The receiver/transmitter preferably comprises an interface to allow control from the central processor, a power supply to provide all the necessary voltages, a modulator and magnetron to provide the radar pulses and a receiver. Regardless of what tracking system is utilized, the tracking system should preferably be useful for tracking multiple independent mobile units, be capable of total remote control operation from another computer, be simple and quick to deploy by personnel with limited training, operate in all temperature and weather conditions, not suffer from interference from any commercial radar systems, be selectable to work in various measurements (e.g. meters, feet, or yards), allow for storage of all operating parameters, and be capable of working over a wide area range. If the ground vehicle is to be remotely operable, it should provide adequate guidance to the vehicle with steering directions for a pre-programmed survey. Ranging and tracking systems, useful in accordance with the invention, include microwave systems, such as the Mini-Ranger Falcon 492, manufactured by Motorola Government Electronics Group of Tempe, Arizona, or ultrasound systems, such as ORNL's Ultrasonic Ranging and Detection System (USRADS) autolocator. The Mini-Ranger includes a rack-mounted range processor, a tabletop control display unit (CDU), a base station receiver/transmitter (RT1 and RT2), up to at least two coded fixed repeaters (CFR), and up to eight mobile units, each with a unique ID code. The system uses a pulse position coding scheme to accomplish both specific repeater and mobile unit selection and identification and digital data transmission. The microwave system allows the driver to follow the side boundaries, as well as the end boundaries, for the path to be scanned.

Other systems, useful for automatically providing locations, such as radio, laser, inertial guidance, or radar systems, may also be utilized in accordance with the invention and the invention is not limited to those discussed above.

The preferred process of the invention for detecting source materials is shown in FIG. 19, which comprises the steps of: 1) providing a predetermined area to the ground vehicle; 2) providing autolocation means to the ground vehicle, such as microwave range-finding; 3) scanning the site via the ground vehicle and collecting data; and 4) analyzing the collected data. In addition, data from aerial surveys can be used to define the survey area in advance.

For a site which is to be cleaned up, the apparatus of the invention is useful for first detecting the source materials to be cleaned up, providing for interim detection efforts, such as scraping, mixing, chemical dissolving, and the like, and then verifying if the clean-up was adequate after clean-up work has occurred.

EXAMPLE I

The apparatus of the invention, with the trademark RTRAK (which stands for Radiation Tracking System), was used to survey the haul road between a site in Riverton, Wyoming, and another location near the Gas Hills Mine in Wyoming. The purpose of the survey was to document existing radiological conditions along Highway 136 prior to hauling mill tailings to Gas Hills. Survey of the 54 mile long haul road was performed in four passes: one of each traffic lane and shoulder, both eastbound and westbound. The survey was completed in 4 working days. Some of the results are illustrated in FIGS. 14 and 15.

The RTRAK apparatus instrumentation was calibrated daily for energy and count-rate. Background checks were performed at least once per day. Electronics were visually checked and various operating parameters were measured to verify proper operation.

Each of the RTRAK's four detectors operated independently, measuring the gamma flux from the soil directly beneath the collimating shields. Detector count rate was converted into an estimate of the Ra-226 concentration. Contaminated areas were identified as contaminated and were shown on the scan path figures as red, widened traces. Each trace represented the reading taken from an area approximately 33 feet long and 2 feet wide.

Significant amounts of contamination were found at both ends of the haul road, extending approximately one mile from the Riverton site and 12 miles from the Gas Hills Site. The contamination near the Riverton site was mainly on the shoulder, with small sporadic areas in the west traffic lane. Contamination extended from the Gas Hills site approximately 8 miles on both lanes and approximately 12 miles on both shoulders. In addition to the contamination at both ends, areas of contamination on the west shoulder of the road were found at approximately 19, 30, and 41-43 miles from the Gas Hills site. The east shoulder had additional contaminated areas at 17 and 19.25 miles from the Riverton site (35 and 37 miles from the Gas Hills site).

Figure 16:
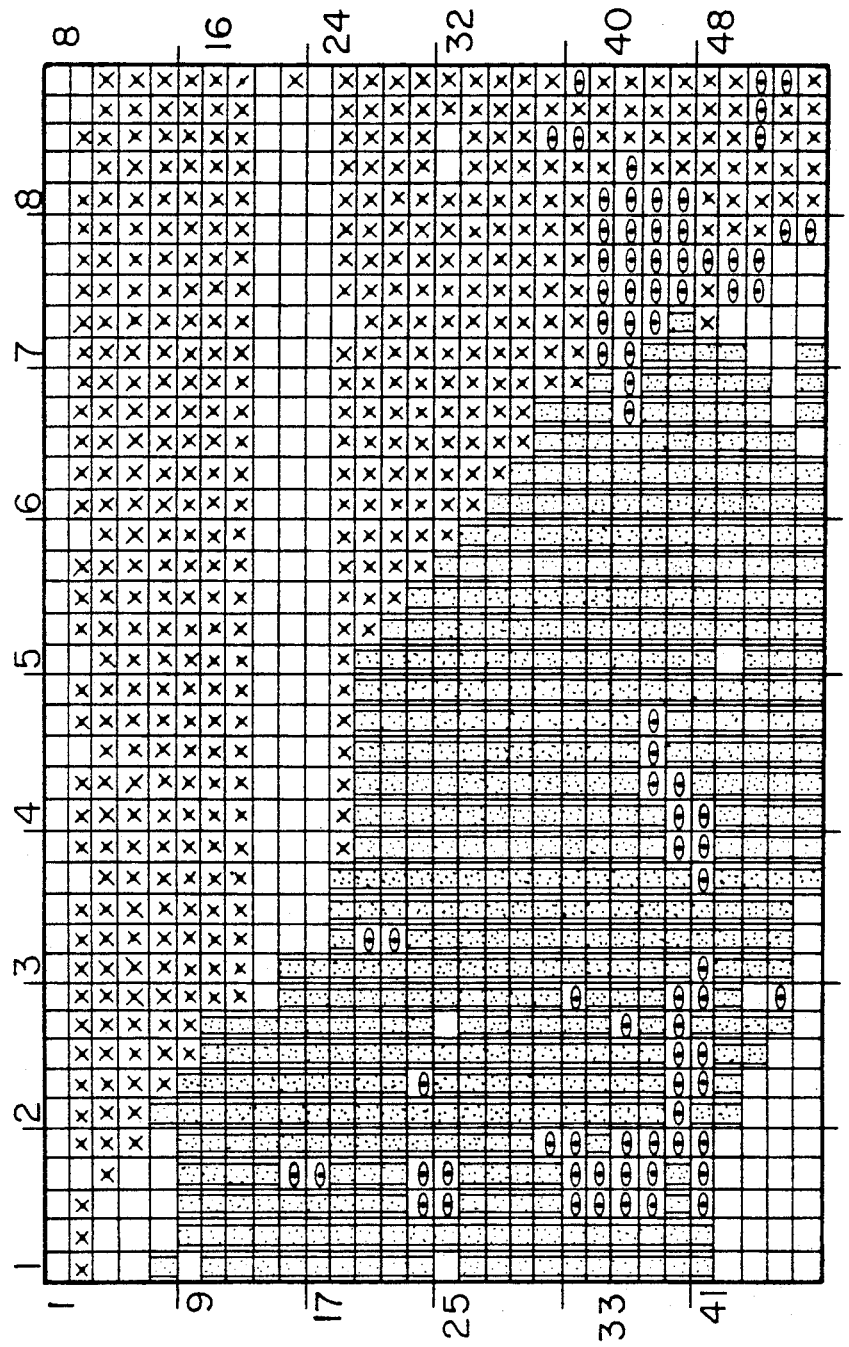
FIG. 16 shows a compilation of scan path data of the preferred embodiment with varying concentrations of radionuclides.

FIGS. 14 and 15 represent only two of more than 100 pages of scan path data which was obtained. FIG. 14 was selected to show a scan path where only a few radiologically active areas were located. FIG. 15 was selected to show a scan path where many radiologically active areas were located. FIG. 16 illustrates a compilation of scan path data of a Tuba City site with varying concentrations of radionuclides. The tickmarks on each of these figures represent 50' intervals.

EXAMPLE II

Soil samples were collected and in-situ detector readings were taken at the windblown mill-tailings area at Ambrosia Lake, New Mexico. The detectors accumulated counts of the 609 keV and 1764 keV Bi-214 (Bismuth) peaks at 20 field locations where composite surface soil samples were also taken. This study was conducted to obtain data to calibrate for this site the four NaI in-situ detectors mounted on the front of the RTRAK. Wheels that supported the detectors were used to maintain a distance of 12 inches from the ground during the monitoring except during extreme variations in terrain. Each detector had a tapered lead shield that restricted its field of view to about 24 inches, with overlap between adjacent detectors. The RTRAK took 2-second interval gamma-ray counts at locations in different regions of the wind-blown mill-tailings area while traveling at 1 mph. Counts of gamma-ray 609 keV and 1764 keV Bi-214 peaks were taken. Both peaks were recorded because, while the 609 keV peak produces more counts per unit time than the 1764 keV peak, the latter peak is less affected by interfering radionuclides that can affect the 609 keV peak. The RTRAK took measurements in different regions of the site so that Ra-226 soil concentrations would cover a range from about 3 pCi/g to greater than 20 pCi/g. This range of concentrations was needed to assure that adequate data was obtained from estimating the calibration equations. While the RTRAK was moving at 1 mph, it sprayed red paint on the ground directly under each of the 4 detectors at the beginning and ending of each 2-second count time.

Immediately after the RTRAK readings were taken, three to five surface soil samples were collected equidistantly (on the detector centerline) between the two paint marks for each of the four detectors. These soil samples were collected to a depth of approximately 15 cm using a hand auger. The soil samples for each detector were emptied into a plastic bucket and mixed vigorously by hand for about 10 seconds. Then a small metal can was filled with 500-g of the mixed soil. The can lid was taped in place for transportation to the laboratory. Within two or three days, the wet weight of the soil in each can was determined, the can was sealed air-tight, and the soil was analyzed for Ra-226 (wet-weight basis). The cans were then stored for 30 days, after which time the soil was again analyzed for Ra-226 (wet-weight basis). The cans were then opened and the soil was dried. The cans were again sealed and analyzed for Ra-226. Following a 30-day waiting period the soil samples were again analyzed for Ra-226, yielding "in-grown" Ra-226 dry-weight concentrations. These "in-grown" data were used to estimate the calibration equations. The Ra-226 concentrations of the soil samples and the gamma-ray measurements taken by the four NaI RTRAK detectors were compared, and found to be the same or similar. The sensitivity of the system was found to be capable of verifying cleanup at less than 5 pCi/g averaged over 100-m$^2$, as specified by the EPA standards. Thus the RTRAK was found to be accurate in its measurements of radiation.

Although the invention has been described with reference to these preferred embodiments, other embodiments can achieve the same results. Variations and modifications of the present invention will be obvious to those skilled in the art and it is intended to cover in the appended claims all such modifications and equivalents.

What is claimed is:

1. A site survey apparatus for detecting a source material present on a site, the apparatus comprising:
   a ground vehicle;
   means for moving and guiding said ground vehicle on a selected path; and
   means for following terrain disposed on said ground vehicle for automatically retaining and independently positioning each of a plurality of detectors above ground, said means being capable of automatically and independently positioning and retaining each of said detectors at a predetermined height above the ground and in a selected positional relationship to other detectors and maintaining the positions of said detectors as said vehicle transverses irregular terrain.

2. The apparatus of claim 1 wherein said detector, retaining, and positioning means comprises wheeled carriage means and detector support means for each said detector for maintaining said detectors in their selected relationship to one another and each said detector at said predetermined height above the ground during travel of said ground vehicle over irregular terrain.

3. The apparatus of claim 2 wherein said wheeled carriage means comprises two wheels for each detector.

4. The apparatus of claim 2 wherein said detector support means for each said detector comprises vertical movement means for providing automatic upward and downward movement of each of said carriage means detectors as said ground vehicle travels over irregular terrain.

5. The apparatus of claim 2 wherein said detector support means comprises swivel means for automatic sideways turning movement of said carriage means and said detector support means as said ground vehicle travels over irregular terrain.

6. The apparatus of claim 1 wherein said detector retaining and positioning means are disposed in front of said ground vehicle.

7. The apparatus of claim 6 wherein said apparatus further comprises means disposed in front of said detector retaining and positioning means for deflecting objects present in the path of travel of said ground vehicle.

8. The apparatus of claim 1 further comprising detector height adjustment means disposed on said ground vehicle and operably connected to said detector retaining and positioning means for raising, lowering, and positioning said detectors at a predetermined height.

9. The apparatus of claim 8 wherein said detector height adjustment means comprises means for raising said detectors above the ground into a retracted, non-use position.

10. The apparatus of claim 8 wherein said detector height adjustment means comprises two horizontal bars on each of which a number of detectors are disposed, a junction wherein said two horizontal bars meet, and means for independently raising each of said horizontal bars upward from said junction.

11. The apparatus of claim 10 wherein when both said horizontal bars are raised, said horizontal bars form a V-shape.

12. The apparatus of claim 1 wherein said moving and guiding means are driver operable.

13. The apparatus of claim 12 further comprising shielding means for preventing a driver from being exposed to the source material.

14. The apparatus of claim 12 further comprising filtering means for providing clean air flow to a driver.

15. The apparatus of claim 1 wherein said moving and guiding means are remotely operable.

16. The apparatus of claim 1 further comprising means for operating said moving and guiding means to move said ground vehicle over a site in accordance with a predetermined site survey scanning pattern.

17. The apparatus of claim 1 further comprising means responsive to said detectors for indicating source material areas on the site.

18. The apparatus of claim 17 wherein said source material indicating means comprises an autolocation system.

19. The apparatus of claim 18 wherein said autolocation system comprises at least one system selected from the group consisting of microwave location, ultrasound location, laser location, radio location, inertial guidance, and radar location.

20. The apparatus of claim 17 wherein said source material indicating means comprises means for mapping source material areas on the site.

21. The apparatus of claim 20 wherein said mapping means comprises means for indicating coordinate locations for source material areas.

22. The apparatus of claim 20 wherein said mapping means comprises means for indicating distance of ground vehicle travel from a starting point.

23. The apparatus of claim 20 wherein said mapping means comprises dead reckoning means.

24. The apparatus of claim 20 wherein said mapping means comprises means for generating a data display indicative of detected source material as a function of distance from a starting point.

25. The apparatus of claim 17 wherein said source material indicating means comprises means for producing a visual depiction of source material areas on the site.

26. The apparatus of claim 17 wherein said source material indicating means comprises means for visually marking source material areas with visually discernible indication means without vehicle operator assistance.

27. The apparatus of claim 26 wherein said means for visually marking said source material areas comprises means for applying paint to a detected area.

28. The apparatus of claim 1 further comprising means responsive to said detectors for generating assessment data regarding sourced material areas.

29. The apparatus of claim 28 wherein said assessment data comprises qualitative data.

30. The apparatus of claim 28 wherein said assessment data comprise quantitative data.

31. The apparatus of claim 28 wherein said means responsive to said detectors for generating assessment data comprises means for storing detector provided data for source material areas.

32. The apparatus of claim 28 wherein said means responsive to said detectors for generating assessment data comprises an on-board computer disposed in said ground vehicle.

33. The apparatus of claim 1 further comprising means for collecting a sample of source material for assessment.

34. The apparatus of claim 33 wherein said sample collection means comprises a tube system.

35. The apparatus of claim 33 wherein said sample collection means comprises an auger system.

36. The apparatus of claim 1 wherein said detectors comprise means for detecting the presence of source material comprising radionuclides.

37. The apparatus of claim 36 wherein said detectors are capable of detecting at least one member selected from the group consisting of alpha particles, beta particles, gamma rays, x-rays, and neutrons.

38. The apparatus of claim 37 wherein said detectors comprise at least one member selected from the group consisting of scintillation detectors and semiconductor detectors.

39. The apparatus of claim 37 wherein assemblies for said detectors are conical shaped, flaring outwards towards the ground.

40. The apparatus of claim 1 wherein the said detectors comprise means for detecting the presence of source material comprising at least one member selected from the group consisting of minerals, ores, metals, oil-containing materials, fuel reprocessing materials, and tailings.

41. The apparatus of claim 40 wherein said detectors comprise metal detectors.

42. The apparatus of claim 40 wherein said detectors comprise photo detectors, responding to neutron activation.

43. The apparatus of claim 1 wherein the said detectors comprise means for detecting the presence of source material comprising toxic materials.

44. The apparatus of claim 1 wherein the said detectors comprise means for detecting the presence of source material comprising hazardous materials.

45. The apparatus of claim 1 wherein the said detectors comprise means for detecting the presence of source material comprising chemical materials.

46. The apparatus of claim 1 wherein the source material comprises at least one member selected from the group consisting of toxic materials, hazardous materials, chemical materials, oil-containing materials, tailings, and fuel reprocessing materials, and said detectors comprise gas detectors.

47. A site survey apparatus comprising:
a ground vehicle;
a plurality of implements associated with said ground vehicle; and
terrain following means disposed on said ground vehicle for independently positioning each of said plurality of implements in a selected relationship to the others and for automatically substantially maintaining each said implement at a determined height above ground as said ground vehicle moves over irregular terrain.

48. A method for detecting a source material present on a site comprising the following steps of:
a) providing a ground vehicle comprising detection means responsive to the source material, the detection means comprising a plurality of detectors which are independently positionable in a selected relationship to each other;
b) scanning the site for the source material by traversing the site with the ground vehicle and the detection means, and automatically maintaining the detection means substantially at a predetermined height above the ground; and
c) providing within the ground vehicle means responsive to the detection means for generating assessment data regarding any source material containing areas, the assessment data comprising the types and quantities of any source material detected on the site.

49. The method of claim 48 further comprising the step of mapping the location of any detected source material.

50. The method of claim 49 wherein the mapping step comprises utilizing Cartesian coordinates.

51. The method of claim 49 further comprising the step of mapping the path of the ground vehicle and any locations of detected source material.

52. The method of claim 49 wherein prior to step a), performing an aerial survey to determine site boundaries.

53. The method of claim 49 further comprising the step of compensating for background data.

* * * * *